United States Patent [19]

Gaffney et al.

[11] Patent Number: 5,098,880

[45] Date of Patent: Mar. 24, 1992

[54] MODIFIED CARBON MOLECULAR SIEVES FOR GAS SEPARATION

[75] Inventors: Thomas R. Gaffney, Allentown; Thomas S. Farris, Bethlehem; Alejandro L. Cabrera, Fogelsville; John N. Armor, Orefield, all of Pa.

[73] Assignee: Air Products and Chemicals, Inc., Allentown, Pa.

[21] Appl. No.: 575,474

[22] Filed: Aug. 30, 1990

[51] Int. Cl.[5] .................. B01J 20/20; C01B 31/00; B01D 53/02

[52] U.S. Cl. .................. 502/432; 55/68; 55/74; 55/75; 264/29.5; 423/445; 423/460; 502/416; 502/417; 502/437

[58] Field of Search .......... 502/416, 417, 432, 437; 264/29.5

[56] References Cited

U.S. PATENT DOCUMENTS

| | | | |
|---|---|---|---|
| 3,801,513 | 4/1974 | Munzner et al. | 252/421 |
| 4,458,022 | 7/1984 | Ohaski et al. | 502/42 |
| 4,880,765 | 11/1989 | Knoblauch et al. | 264/29.5 |
| 4,933,314 | 6/1990 | Marumo et al. | 502/432 |

FOREIGN PATENT DOCUMENTS 49-37036 10/1974 Japan.
62-176908 3/1987 Japan.

OTHER PUBLICATIONS

P. L. Walker, Jr., "Molecular Sieves," Mineral Industries, Jan. 1966, pp. 1–8.
Y. Nakano, "Control of Micropores of Molecular Sieving Carbon by Impregnation of Hydrocarbons and Heat Treatment," Presented at 20th Spring Chemical Industrial Convention at Hirneji, Oct. (1987).
K. Chihara et al., "Air Separation by Modified Molecular Sieving Carbon", Proc. Third Pacific Chem. Eng. Congress, vol. 1 (1983).
S. I. Surinova, "Formation of the Porous Structure of Carbon Molecular Sieves from Caking Coals," Khim. Tevrd. Top. Moscow (1988).
W. P. Hoffman et al., "Pyrolysis of Propylene Over Carbon Active Sites II Pyrolysis Products," Carbon, vol. 26, No. 4, pp. 485–499 (1988).

Primary Examiner—Paul E. Konopka
Attorney, Agent, or Firm—Mark L. Rodgers; William F. Marsh; James C. Simmons

[57] ABSTRACT

A process is provided for making a modified carbon molecular sieve which is suitable for separating gases having different adsorption rates on the sieve. The process involves modifying a starting sieve support having a majority of micropores with an effective pore size of about 4.5 to 8 angstroms, with a two-step process in which the sieve is contacted with two different volatile carbon-containing organic compounds, preferably hydrocarbons, which have different molecular dimensions. The compound used in the first step is larger than that in the second step, so that the pore openings of the micropores of the support are narrowed successively in two distinct steps without filling the micropores themselves. The invention also discloses an improved carbon molecular sieve and the separation of gases, such as oxygen from nitrogen, by the use of this improved adsorbent.

6 Claims, 4 Drawing Sheets

MODIFIED CARBON MOLECULAR SIEVES FOR GAS SEPARATION

FIELD OF INVENTION

This invention relates to a process for modifying a carbon molecular sieve adsorbent to enhance its utility for gas separation by depositing carbon on the adsorbent in order to change the effective diameter of its micropore openings. In another aspect it relates to the modified carbon molecular sieve adsorbents which are produced by this process. Still another aspect of the invention relates to the separation of gases using these modified carbon molecular sieve adsorbents.

BACKGROUND OF INVENTION

The use of carbon molecular sieves to separate various materials has been known for several decades. Walker in "Molecular Sieves" *Mineral Industries* (January 1966) discloses obtaining carbon molecular sieves by charring polyvinylidine chloride and vinyl chloride-vinylidine chloride copolymer. These chars are said to have large micropores and are useful for the separation of hydrocarbons. The sieves can be modified by combining the char with a thermosetting furan resin or lignite pitch and carbonizing the product.

U.S. Pat. No. 3,801,513, Munzner, et al., (1974) states that it was not known that carbon molecular sieves (CMS) derived from PVDC could be suitable for the separation of oxygen and nitrogen. This reference describes obtaining CMS for oxygen separation by treating coke having volatile components of up to 5% with a carbonaceous substance which splits off carbon at 600° to 900° C, thereby narrowing the pores present in the coke. It is stated that the average pore size of the adsorbent must be below 3 angstroms to effect oxygen separation from nitrogen. The average pore diameter can be adjusted by changing the intensity of the treatment. Coconut shell coke is a suitable starting material, among others. A preference is stated for a particle size in the range of 0.1 to 20 millimeters and suitable carbonaceous substances which can be used in the treatment include benzene, ethylene, ethane, hexane, cyclohexane, methanol, and the like. It is stated that if coking is carried out with pitch, bitumin, tar or tar oil, gaseous coking materials are formed in the heat treatment and this atmosphere can be adjusted to exert the desired effect. In this way, introduction of at least part of the carbonaceous substance is avoided, but addition of the carbonaceous substance can modify the coke to increase its separating capacity.

Japanese Publication No. Sho 49-37036 (1974) describes making a carbon molecular sieve by condensing or polymerizing a phenol resin or furan resin so that the resin is adsorbed on a carbon adsorbent and thereafter carbonizing the product by heating. Mixtures of the resins can also be used. The resin forming material is dissolved in water, methanol, benzene or creosote oil and the solution is used to impregnate the carbon adsorbent. Carbonizing can be carried out at 400° to 1,000° C. in an inert gas. This operation is said to reduce the pore diameter of the carbon adsorbent.

Nakano et al., "Control of Micropores of Molecular Sieving Carbon by Impregnation of Hydrocarbons and Heat Treatment", presented at the 20th Spring Chemical-Industrial Convention at Hirneji, October (1987) describe modification of molecular sieving carbon having micropores less than 5 angstroms in diameter by impregnation with hydrocarbon mixtures and thereafter heat treating at 750 to 950° C in order to control micropore diameter to 2.B to 4 angstroms and make the CMS suitable for separating oxygen and nitrogen. Granulated carbon was formed from coal tar or coal tar pitch and coconut char. The liquid hydrocarbons used for impregnating the carbon were mixtures of napthalene with coal tar, diphenyl or fluorene in various concentrations from 5 to 50 wt. %. Fluorene was found to have the greatest effect on oxygen and nitrogen adsorption rates.

Chihara et al., Proc. Third Pacific Chem. Eng. Congress, Vol. 1 (1983) discloses that CMS which is a pelletized granular activated carbon can be treated by thermally decomposing benzene in a fluidized bed of the CMS to deposit carbon thereon and thereby adjust the overall mass transfer coefficients of oxygen and nitrogen in the CMS. A nitrogen product gas of 99.5% purity was obtained by pressure swing adsorption. A constant adsorption capacity was interpreted as indicating carbon deposition at the mouth of the micropore.

U.S. Pat. No. 4,458,022, Ohsaki et al., (1984) refers to several prior art processes for narrowing the micropores of active carbon by precipitating soot in the micropores and describes a method said to provide improved selectivity for separating nitrogen from air. The method involved using coconut shell charcoal and coal tar binder, acid washing, adding coal tar and heating to 950° to 1,000° C. for 10 to 60 minutes. The coal tar is said to penetrate into the surface of the active carbon and decompose to grow carbon crystallite on the inner surface of the micropore. It is stated that for PSA separation of nitrogen and oxygen, the oxygen adsorption capacity should be more than 5 milliliters (STP) per gram and the selectivity more than 22 to 23.

Japanese Patent Application No. Sho 62-176908 (1987) discloses a method for making carbon molecular sieves suitable for separating oxygen and nitrogen involving the use of carbon from coconut shells and coal tar or coal tar pitch binder to form particles which are dry distilled at 600° to 900° C., washed with mineral acid and water and dried, and then impregnated with creosote, 2,3-dimethylnapthalene, 2,4-xylenol or quinoline and heat treated for 10 to 60 minutes at 600° to 900° C. in inert gas. Both oxygen adsorption rate and selectivity are said to be improved and the procedure is said to be superior to the use of hydrocarbons, such as benzene, pyrolyzed in the gas phase so that carbon produced adheres to the carbonaceous surface.

Surinova, Khim. Tevrd. Top., Moscow (5) 86–90 (1988) describes obtaining carbon molecular sieves for concentration of nitrogen from air by carbonizing gaseous coals using benzene vapor and inert gas. The treatment had no effect on macropores but the pyrocarbon formed on decomposition of benzene is said to block the micropore inlets. Although this reference contains some recognition of the relationship between the hydrocarbon size and the pore size of the carbon, the work was apparently unsuccessful in reducing the concept to practice on coal samples whose capacity had been increased by oxidative treatment.

Hoffman, et al., "Pyrolysis of Propylene Over Carbon Active Sites II. Pyrolysis Products", Carbon Vol. 26, No. 4, pages 485–499 (1988) describe depositing carbon on graphitized carbon black by thermal decomposition of propylene, recognizing that propylene is excluded from some of the carbon sites. Both oxidized and unoxidized carbon samples were studied.

None of the above references describe a procedure which is suitable for modifying carbon molecular sieves which have a large population of relatively small micropores, on the order of 4.5 to 8 angstroms, but are still too large for effective separation of gases such as oxygen and nitrogen. In order to be effective for air separation by pressure swing adsorption (PSA) the adsorbent must not only exhibit good selectivity as suggested by the '022 patent, but must also have a high adsorbing capacity and permit high rates of gas throughput. While it is known that CMS having micropores on the order of ~4 angstroms can be used successfully for this purpose, these adsorbents are very expensive and it is highly desirable to find a method of modifying a less expensive CMS, such as one having a characteristic pore size of about 5 angstroms, by a simple straight-forward procedure.

Although air separation can be effected over carbon molecular sieve adsorbents (CMS's), these adsorbents separate oxygen from air on a kinetic basis, sorbing the smaller oxygen molecules rapidly relative to the slightly larger nitrogen molecules. In order to effect separation the adsorbent must have pore openings of about the molecular diameter of the larger gas in the mixture (nitrogen in air). This allows for rapid adsorption of the smaller component and slower diffusion of the larger component, resulting in high kinetic selectivity. The ability to control the size of the pore openings on a CMS to exacting specifications, to tenths of an angstrom in the case of air separation, is a major challenge for preparing CMS adsorbents. Improved CMS adsorbents are needed to reduce the cost of air separation by pressure swing absorption (PSA) systems since the adsorbent is a key part of the performance of the entire process unit.

SUMMARY OF THE INVENTION

We have found that kinetically oxygen-selective adsorbents can be prepared from a variety of porous carbons by forming a carbonaceous surface layer on the carbon support in a particular manner. Selective pyrolysis of a molecule that is too large to penetrate the micropores of the carbon support produces microporous domains of carbon which have high kinetic selectivity for oxygen relative to nitrogen owing to the deposition of carbonaceous residue at the pore mouth openings. We have identified a two step method of promoting surface barrier formation via pyrolysis of a volatile carbon-containing organic compound, preferably a hydrocarbon. First, surface cracking is accomplished using an organic compound that is too large to penetrate the small micropores of the carbon support. This cracking is carried out until most, but not all of the micropores are narrowed to about 4.0 Å. Subsequently a smaller organic compound is cracked on the intermediate product until the remaining (large) micropores are narrowed to about 4.0 Å. This effectively increases the working selectivity of the intermediate product (that had only the large hydrocarbon cracked on it) by a factor of 2-3, with a much smaller (~40%) loss in $O_2$ adsorption rate. In contrast, prolonged coking with the large organic compound causes adsorption rates to decrease faster than selectivity increases. The present procedure has been found to impart $O_2$ selectivity to carbons with pores too large to be effectively modified by existing technology.

According to our invention a process is provided for making a modified carbon molecular sieve adsorbent which is suitable for separating gases which have differing molecular dimensions that effect their adsorption rates. This modification is carried out by treating a starting carbon molecular sieve support which can be characterized as having a portion of its micropores with a nominal size in the range of about 4.5 to B angstroms. The modification procedure involves: (a) contacting the starting carbon molecular sieve support under pyrolysis conditions with a first volatile carbon-containing organic compound, having a molecular dimension which precludes penetration of the micropores of about 4.5 to 8 angstroms for a time sufficient to allow a carbonaceous surface layer to form on the support, thereby forming an intermediate carbon molecular sieve, having narrowed pore openings and thereafter (b) contacting this intermediate carbon molecular sieve under pyrolysis conditions in the absence of the first organic compound, but in the presence of a second volatile carbon-containing organic compound, having a molecular dimension smaller than that of said first organic compound, but large enough to preclude penetration of most of the micropores remaining in the intermediate carbon molecular sieve.

This invention also provides a novel modified carbon molecular sieve which has its micropore openings narrowed by the deposition of carbon in two distinct steps involving two different sizes of carbon-containing compounds which decompose to provide the carbon deposition.

The invention also includes the separation of gases by selective adsorption using the improved modified carbon molecular sieve of the invention.

DETAILED DESCRIPTION OF THE INVENTION

Kinetic selectivity can be imparted to microporous carbons by pyrolyzing a reagent that will leave carbonaceous residue on the carbon substrate. It is known that pyrolysis of a carbonaceous substance on select coal samples imparts kinetic oxygen selectivity (U.S. Pat. No. 3,801,513). Other methods of imparting kinetic oxygen selectivity include treating coconut shell derived microporous carbons with coal tar pitch (U.S. Pat. No. 4,458,022), creosote, 2,3-dimethylnapthalene, 2,4-xylenol, or quinoline (Sho 62-176908), and treatment of carbon derived from furan or phenol resins with phenols, aldehydes, or furfuryl alcohol (Sho 49-37036). In each of these cases, the pore properties of the carbon substrate are critically important to the success of the treatment in imparting oxygen selectivity to the product. We have found that the carbon source must be comprised of pores of about 4 Å for these prior art treatments to impart fast kinetic oxygen selectivity over nitrogen. In addition, the granular or pelleted material must contain a sufficient number of transport pores (~0.1-1.0 μm) to assure rapid transport of the $O_2$ and $N_2$ to the size selective micropores.

All molecular sizes refer to those typically described as minimum van der Waals diameters. Here $O_2$ is 2.8 Å in width while $N_2$ is 3.0 Å. This contrasts to the Leonard Jones α value where the width of $O_2$ is 3.46 Å and $N_2$ is 3.64 Å (Ref: D. W. Breck, "Zeolite Molecular Sieves," *Wiley-Interscience*, N.Y., N.Y., p.636). In principal, however, the pores must be somewhat larger than the minimum critical dimensions of the diffusing molecule due to additional energy barriers (e.g., interaction of ρ electron density, etc., with the walls of slit shaped pores; Ref: M. B. Rao, et al. Langmuir. 1, 137 (1985)). Thus, we observe pores for distinguishing $O_2$ from $N_2$ should be ~3.8, but <4.3 Å.

The two step pyrolysis treatment allows a uniform narrowing of poremouth openings having an effective size in the range of about 4.5 to 8, preferably 4.5 to 6, angstroms to about 4.0 Å. This treatment is superior to any single step treatment, since it allows a very high percentage of the pore openings to be narrowed such that they become kinetically selective for oxygen adsorption relative to nitrogen, without becoming so narrow that adsorption becomes slow, or the pores become blocked.

While not to be bound by theory, it is believed that this two step process is effective because when a large hydrocarbon is cracked on the porous carbon, some of the micropore openings are narrowed to the point that they discriminate between $O_2$ and $N_2$ by size. Continued coking with a large hydrocarbon narrows all of the pore mouth openings, resulting in closure of some pore openings (to <3.8 angstroms) by the time the larger openings are narrowed to 3.8-4.0 angstroms. The use of a specific smaller hydrocarbon in a discreet second step allows the unselective openings to be coked without further narrowing the selective pore openings. This occurs due to the smaller hydrocarbons ability to penetrate 4.0-4.3 angstrom pores and crack in the pore mouth entrances, and their inability to penetrate pores smaller than 4.0 angstroms. A larger hydrocarbon can only crack on the external surface and over cokes the selective pore openings before imparting selectivity to the remaining unselective pore openings.

Simultaneous cracking of the large and small hydrocarbon is ineffective and results in low capacity adsorbents with slow adsorption rates. To impart fast kinetics and oxygen selectivity to pores with 5 Å-6 Å openings, it is essential that the hydrocarbons are used separately and in order of decreasing size.

The starting carbon molecular sieve support can be any CMS having micropores, which are generally considered to have a size less than 20 angstroms, in which a majority of the micropores have sizes which are less than 8 angstroms and greater than 3.4 angstroms. In order to gain the advantages of this invention, some of the micropores should have a size of at least 4.5 angstroms, since if the size of the micropores is below this figure, modification to improve oxygen/nitrogen selectivity can be achieved in a single step carbon deposition process and the starting CMS support will be a much more expensive and therefore of less advantage to modify than those CMS supports in the 4.5 to 8 angstrom range of characteristic pore size. Coconut shell carbon is one suitable source for supports which can be used to advantage in this invention. If there is a predominance of pores beyond 8 Å, treatment with a larger hydrocarbon will be required, perhaps necessitating more than two steps.

The treating compound which supplies the carbon for narrowing the pore diameter of the support can be any volatile carbon-containing organic molecule, including hydrocarbon and compounds with hetero atoms such as oxygen, nitrogen, sulfur, silicon and the like, provided that the compound can decompose cleanly without forming pore-plugging materials. It is important, however, for the carbon-containing compounds which are used in steps 1 and 2 to have two different minimum effective dimension (MED). While this dimension cannot be measured from a molecular model of the compound because of other inhibiting effects which control the ability of the molecule to enter the micropores of the adsorbate, the dimension can be determined empirically by calibration with a CMS of known pore dimensions as determined by a plug gauge method described hereinafter. Compounds which are useful in the first step of the treating method include 1,3,5-trimethylcyclo- hexane, 1,1-dimethylcyclohexane or cineole and other compounds, preferably hydrocarbons, having a similar MED.

In the second step of the process, the volatile carbon-containing organic compound should have an MED which precludes penetration of the micropores, but yet is smaller than the MED of the compound used in the first step. Examples of such compounds include isobutylene, isobutane, 2,2,3-trimethylbutane, isooctane, cyclohexane, and such compounds having similar MED.

The conditions of pyrolysis can be approximately the same (or quite different) in both steps and generally include temperatures in the range of 500° to 900° C., preferably about 550 to 900° C., and pressures under which the treating carbon containing compound is gaseous, preferably about $P_{HC}=0.2$, $P_{TOT}=1$ atmosphere. The flow rates and concentrations of the treating material as well as temperatures can be adjusted along with the duration of the treating step in order to modify the effects desired. In general, a lower flow rate produces more severe conditions as do higher concentrations of the carbon-containing compound, longer times and higher temperatures. These factors are interdependent and can be balanced against each other but are also affected by the amount of the carbon-containing compound, the size of the reactor, its configuration, preheating and volatility of the organic compound. If the organic compound is normally a liquid, it can readily be vaporized in an inert carrier gas and gaseous treating compounds can be diluted with inert gases over a broad range of proportions. As an example, a mixture containing about 20 volume percent of the carbon-containing compound in an inert carrier gas is suitable.

In order to illustrate our invention more fully, the following examples are presented which should not be construed to limit our invention unduly.

EXAMPLES 1-20

In the following examples, Nos. 18, 19 and 20 illustrate the invention while Nos. 1-17 are comparative examples which contribute to understanding the invention and how the two-step pyrolysis treatment leads to improved results. Reaction conditions for pyrolysis of the carbon-containing organic compound and adsorptive data for the base and treated carbon molecular sieves (CMS) are given in Table I. The characteristic pore size for the base CMS used is given as either 3A, 4A or 5A. These carbons are available from commercial suppliers. Carbon 3A is selective at separating $O_2$ from $N_2$, based on the different rates of adsorption, 4A and 5A are not.

The carbon-containing organic compounds were all hydrocarbons, either propylene (Examples 1 and 3), isobutylene (Examples 4, 6-8 and step 2 of Examples 18-20), cyclohexane (Examples 9-13), 1,1-dimethylcyclohexane (DMC) (Example 14), and 1,3,5-trimethylcyclohexane (TMC) (Examples 15-17 and step 1 of Examples 18-20). In Examples 3, 4 and 6-8, 68 cc helium per minute plus 18 cc hydrocarbon per minute flowed over 15 g of base carbon in the treating step. The same flow rate was used in the second step of Examples 18-20. In Examples 9-14, and 17, 215 cc $N_2$/min. was bubbled through a saturater filled with liquid hydrocarbon at the temperature ranges given in Table I. The same flow rate was used for the first step of Examples 18-20. The flow rates for Examples 15 and 16 were somewhat higher than 215 cc $N_2$/min. but the procedure was the same as for Examples 9-14.

$\theta O_2$, although $N_2$ productivity and recovery are the determining factors. Accordingly, Example 20, with a selectivity of 20, but a $\theta O_2$ of 2.4, is also an attractive material.

TABLE II

| Example | Pure Component Mass Transfer Coef. (1/sec.) | | Selectivities* | |
|---|---|---|---|---|
| | $\theta O_2 \times 10^{-2}$ | $\theta N_2 \times 10^{-3}$ | Pure Component | CAU |
| 1 | 0.75 | 0.15 | 50 | 60 |
| 3 | 0.1 | 0.01 | 100 | 120 |
| 4 | 3.2 | 1.1 | 30 | 38 |
| 20 | 2.4 | 1.2 | 20 | 28 |

*Selectivity = $\theta O_2 / \theta N_2$

TABLE I

| Example | Base CMS | Treating Compound | Pyrolysis Conditions T °C | Pyrolysis Conditions Hours | Saturator Temp. °C | Mass Transfer Coef. (1/min.) l ($O_2$) | Mass Transfer Coef. (1/min.) m ($N_2$) | Selectivity | System Pressure After 1 Hour (Torr) |
|---|---|---|---|---|---|---|---|---|---|
| 1 | 3A | propylene | 600 | 0.083 | | | | 60 | 280 |
| 1A | 3A | none | — | — | | 6.3 | 0.17 | 37 | 240 |
| 2 | 4A | none | — | — | | | | | 240 |
| 3 | 4A | propylene | 600 | 2 | | 3.6 | 0.03 | 120 | 360 |
| 4 | 4A | isobutylene | 600 | 2 | | 8.1 | 0.21 | 38 | 250 |
| 5 | 5A | none | — | — | | | | | 260 |
| 6 | 5A | isobutylene | 600 | 2 | | | | | 300 |
| 7 | 5A | isobutylene | 600 | 4 | | | | | 315 |
| 8 | 5A | isobutylene | 600 | 6 | | 1.5 | 0.017 | 88 | 400 |
| 9 | 5A | cyclohexane | 600 | 2 | 35-40 | | | | 275 |
| 10 | 5A | cyclohexane | 650 | 2 | 35-40 | | | | 270 |
| 11 | 5A | cyclohexane | 675 | 2 | 35-40 | 7.4 | 0.5 | 15 | 290 |
| 12 | 5A | cyclohexane | 675 | 4 | 35-40 | | | | 425 |
| 13 | 5A | cyclohexane | 700 | 3 | 35-40 | | | | 450 |
| 14 | 5A | 1,1-DMC | | | 65-70 | 10.7 | 1.0 | 11 | 300 |
| 15 | 5A | 1,3,5-TMC | 675 | 2.5 | 70-90 | 9.7 | 0.82 | 12 | 282 |
| 16 | 5A | 1,3,5-TMC | 675 | 3+ | 70-90 | | | | 315 |
| 17 | 5A | 1,3,5-TMC | 675 | 5 | 70-90 | 7.4 | 0.42 | 17 | 275 |
| 18 | 5A | 1,3,5-TMC | 675 | 2.5 | 70-90 | | | | |
| | 2d step | isobutylene | 600 | 1.0 | | 6.6 | 0.22 | 30 | 283 |
| 19 | 5A | 1,3,5-TMC | 675 | 2.5 | 70-90 | | | | |
| | 2d step | isobutylene | 600 | 1.5 | | 5.6 | 0.16 | 36 | 293 |
| 20 | 5A | 1,3,5-TMC | 675 | 5 | 70-90 | | | | |
| | 2d step | isobutylene | 600 | 0.5 | | 7.0 | 0.25 | 28 | 270 |

The mass transfer coefficients, selectivities and final pressures were determined using a Circulating Adsorption Unit (CAU). The adsorptive properties were measured in this system which monitors gas pressure and composition as a function of time. Outgassed adsorbent was exposed to a fixed volume of a 21%/79% $O_2/N_2$ gas mixture, and pressure and composition were monitored as a function of time. For samples which exhibited appreciable kinetic $O_2$ selectivity without concomitant loss of capacity (judged by <10% increase in the final equilibrium pressure for a coked sample versus the base carbon), quantitative curve fitting routines were used to determine mass transfer coefficients for $O_2$ and $N_2$ adsorption. The ratio of these mass transfer coefficients (calculation based on a linear driving force model) is the kinetic selectivity.

For the best adsorbents prepared, further testing on a volumetric unit (to 6 atm) using pure $O_2$ and pure $N_2$ was performed. Mass transfer coefficients derived from pure component testing have different values than those measured from gas mixtures, owing to differences in the adsorptive tests (different initial and final gas pressures and different values for dosing volume to sample weight for each test method). However, the kinetic selectivities as determined by the two test methods, which are the ratios of the mass transfer coefficients, correspond directly, as shown in Table II. The objective is to achieve as high a selectivity as possible while maintaining a high

EXAMPLE 21

The procedure of Example 20 was repeated except that the 1,3,5-tri-methylcyclohexane and isobutylene were added simultaneously in treating a 5A CMS. Pyrolysis conditions were 675° C. and 2 hours. Saturator temperature for the 1,3,5-TMC was 80°-90° C. The inert gas carrier was helium at a flow rate of 215 cc/min. The isobutylene flow added was 54 cc/min. In a CAU adsorption test for separation of $O_2$ and $N_2$, the system pressure after 1 hour was 530 torr (vs. 270 torr for #20) indicating a product of very low capacity.

This demonstrates that two distinct pyrolysis steps are essential and that the two carbon-containing compounds cannot be added together in one step in an attempt to modifying the pore openings of a 5A CMS.

While these examples illustrate the separation of oxygen and nitrogen, other gaseous materials can be separated with the CMS adsorbents of this invention, for example other air gases, hydrogen and methane, carbon dioxide and nitrogen, propane and propylene, and the like. In general, any gases can be separated providing they have differing molecular dimensions which effect their adsorption rates on the adsorbate. The invention, however, is particularly well suited for the separation of oxygen and nitrogen, such as in a pressure swing adsorption system. In this case of selectivity should be 20 or greater and the minimum mass transfer rate coefficient for oxygen (l) should be equal to or greater than 4 as determined by a Circulating Adsorption Unit procedure as described herein. For other gas mixtures, the critical pore size can be adjusted by careful control of the pyrolysis of the hydrocarbon.

Referring to Table I, the system pressure after one hour is an equilibrium condition which indicates the adsorptive capacity of the CMS. In these examples which can be compared with each other, an equilibrium pressure below 300 Torr indicates good capacity for the treated CMS. Selectivities above 15 and preferably above 20 are desirable for these runs provided that higher selectivity is not achieved at the expense of reduced rates and adsorbent capacity. For oxygen/nitrogen separation, the mass transfer coefficients for oxygen (l) should be high and for nitrogen (m) low. In these runs, an l value above 5 was desired with an m value below 0.3.

The kinetic selectivity of an oxygen selective CMS, which had pore openings of about 3.8–4.0 Å, was increased by cracking propylene onto the surface of the CMS (Example 1, Table 1). The kinetic selectivity increased with reaction time, but there was a concomitant decrease in the adsorption rates of both oxygen and nitrogen. However, propylene cracking was ineffective at imparting facile oxygen selectivity to a carbon with significant micropore volume above 4.3 Å (Example 3). In this case, adsorptive capacity decreased and adsorption rates slowed to unacceptably low values (for a PSA process). When a slightly larger molecule, isobutylene, was used, 4.5 Å pores were narrowed to about 4.0 Å at the pore mouth, and rapid adsorption rates coupled with kinetic $O_2$ selectivity was achieved for virtually all of the adsorption (Example 4) There was no significant loss of adsorptive capacity associated with the isobutylene treatment for a carbon with 4 Å pores. On the other hand, when carbon with pores of about 5.8 Å (5A) was treated in a similar manner with isobutylene, adsorptive capacity decreased and adsorption rates slowed to unacceptably low values (Examples 5-8), much like the results for propylene cracking on 4A. The hydrocarbon chosen should have, therefore, a minimum effective dimension (MED), at the conditions of the reaction, as large or larger than the micropore opening it is to crack on.

The physical picture that is consistent with these results is cracking of a hydrocarbon which is too large to enter the micropore channel of the carbon at the pore mouth. This enables one to deposit a surface barrier sufficient to impart kinetic $O_2$ selectivity while maintaining good $O_2$ and $N_2$ transport in and out of the adsorbent during adsorption and desorption cycles, respectively Cracking a hydrocarbon which is small enough to easily penetrate the pore openings of the carbon under cracking conditions deposits carbon in the pore channel which has a deleterious effect on transport properties ($N_2$ desorption rate and consequently working capacity for $O_2$).

In the case of 5A CMS, cracking a larger hydrocarbon molecule (isooctane, cyclohexane, 1,1-dimethylcyclohexane, 1,3,5-trimethylcyclohexane) allowed higher kinetic selectivity to be achieved, but in all cases adsorption rates slowed to unacceptably low values and capacity losses were significant before high (>15) kinetic selectivity was achieved (Examples 9-17).

A portion (ca. 15%) of unselective adsorption usually remains in a 5A CMS that has been coked with a large hydrocarbon like 1,1-dimethylcyclohexane or 1,3,5-trimethylcyclohexane. This relatively small amount (15%) of unselective adsorption has a large effect on the working selectivity of the composite adsorbent, lowering selectivity by about a factor of three from the selectivity value if all adsorption occurs in an $O_2$ selective manner (100%). Attempts to impart $O_2$ selectivity to the unselective portion have included the use of higher temperature, longer reaction time, and large hydrocarbons. Unfortunately, higher temperatures and longer reaction times led to loss of capacity and rates became unacceptably slow before complete $O_2$ selectivity was achieved.

The data of Examples 18-20 show that pyrolysis of a large hydrocarbon followed by pyrolysis of a smaller hydrocarbon allowed $O_2$ selectivity to be imparted to virtually all of the pores in the carbon, effectively tripling the working selectivity of the product. Pyrolysis of 1,3,5-trimethylcyclohexane on 5A under optimum conditions yielded an adsorbent with about 85% kinetically selective $O_2$ adsorption (Example 16). A secondary treatment with isobutylene imparted $O_2$ selectivity to the unselective pores of the intermediate product without causing a loss of capacity or slowing adsorption rates to unacceptable levels (Examples 18-20). The product had adsorptive properties similar to commercial CMS adsorbents. Cracking isobutylene on the intermediate allowed adsorption rates to be decreased and selectivity increased to levels comparable to those of the commercial CMS's, with no significant capacity loss. With prolonged cracking of isobutylene, 1.5 additional hours of exposure, some adsorptive capacity was lost.

It is essential to maintain fast adsorption while making as much adsorption as possible kinetically $O_2$ selective by cracking the large hydrocarbon. The secondary treatment with a smaller hydrocarbon is then used to fine tune the kinetics. The large hydrocarbon should have a minimum effective dimension that is large enough to slow diffusion in the micropores, thereby promoting pore mouth cracking. The small hydrocarbon should have a minimum effective dimension large enough for it to be excluded from the smallest micropore openings present after treating with the large hydrocarbon, but small enough to at least partially penetrate the largest remaining micropore mouth openings. This allows the small hydrocarbon to further narrow the remaining pore mouth openings larger than 4 angstroms without further narrowing the pore mouth openings less than 4 angstroms in diameter.

The size of the micropores which characterize the carbon molecular sieve is determined by a plug gauge method using the adsorption of various organic vapors over a 24 hour period measured on a McBain-Bakr adsorption balance.

Figure 1:
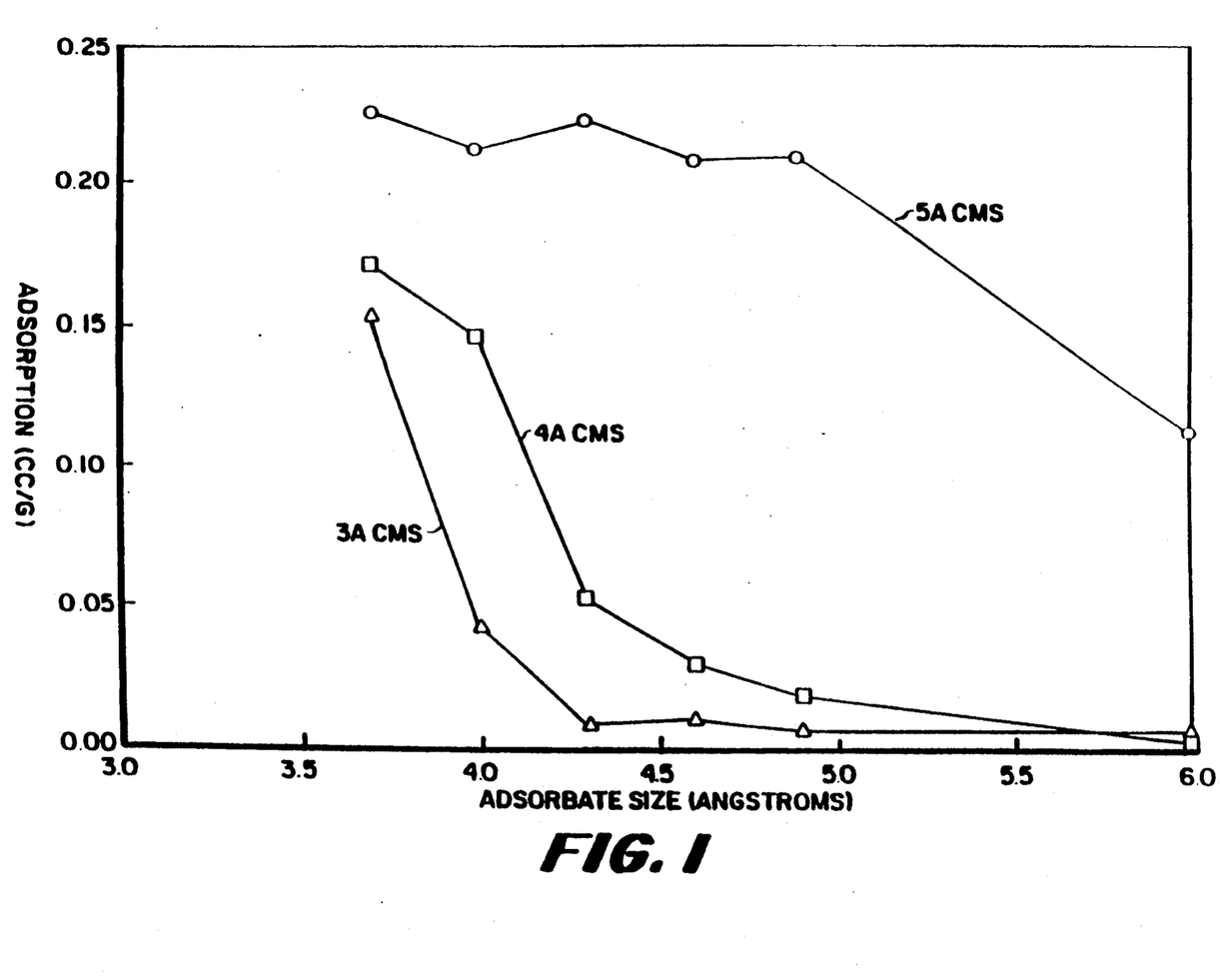
FIG. 1 is a graph showing the cumulative distribution of microporosity for three different base carbon molecular sieve adsorbents.

FIG. 1 shows the uptake of molecules of varying size (after 24 hours of exposure at a partial pressure, P/Po, of 0.5) on three different base carbons. This molecular plug gauge method measured the pore volume accessible to molecules in a very narrow size range. Carbons 4A and 5A were highly microporous carbons that do not exhibit significant kinetic selectivity for oxygen relative to nitrogen. FIG. 1 shows how their pore size distributions differed. The 4A carbon had the majority of its micropores in the 4.0–4.3 angstrom range whereas the 5A carbon had much of its microporosity above 5 angstroms. Carbon 3A was a CMS which had high kinetic selectivity for oxygen relative to nitrogen. FIG. 1 shows that its microporosity was almost exclusively below 4 angstroms.

Figure 2:
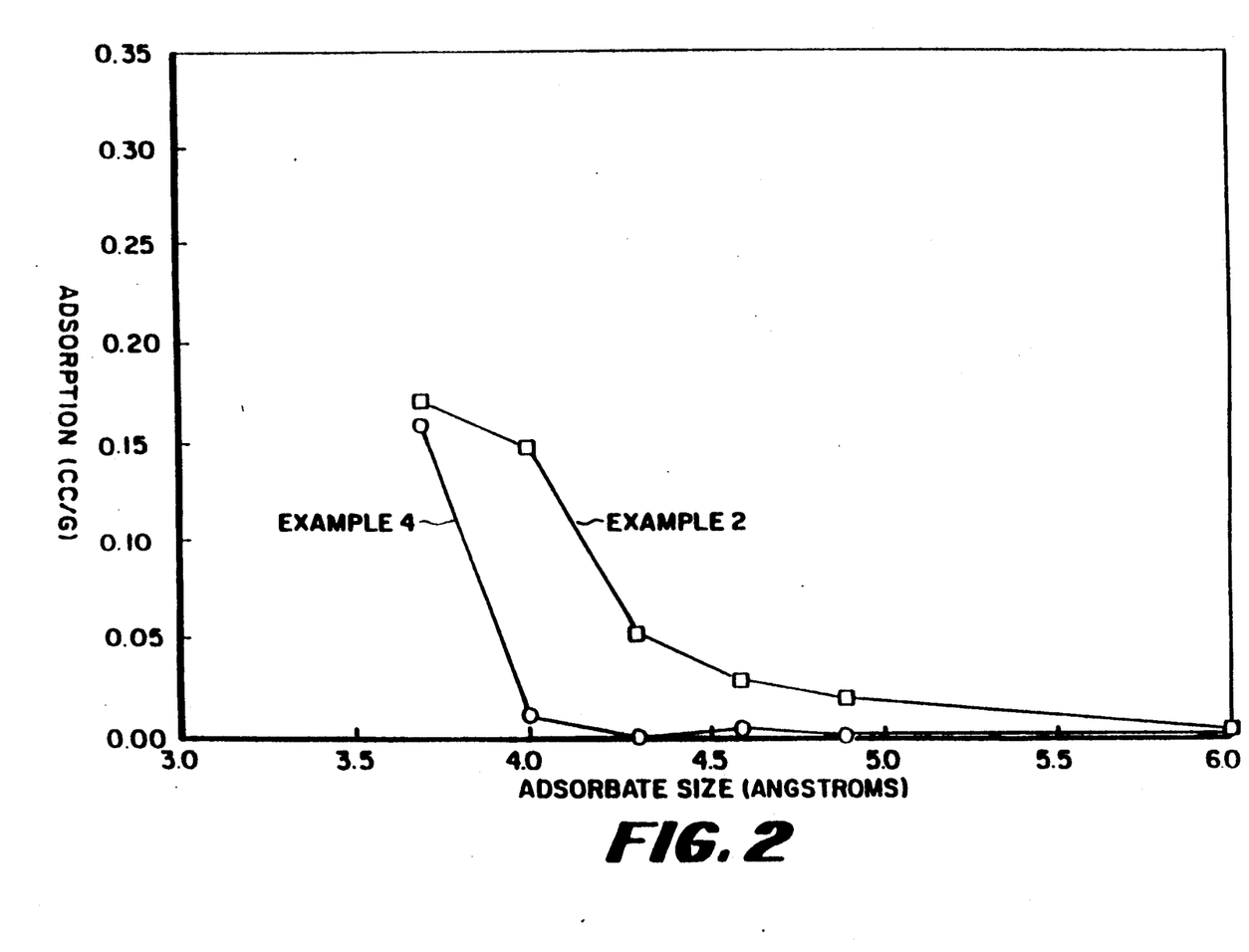
FIGS. 2-4 are graphs showing the effect of hydrocarbon pyrolysis and carbon deposition on carbon molecular sieves having different initial porosity.

The organic materials used for the data of FIG. 2 are given in Table III.

TABLE III

| RUN SEQ. | CHEMICAL NAME | MOLE WT. | DENSITY G/CC | MOLECULE* SIZE, Å | SAMPLE TEMP. °C. | VAPOR PRES., torr |
|---|---|---|---|---|---|---|
| 1. | Isopentane | 72.15 | 0.6201 | 4.9 | 28.0 | 360.0 |
| 2. | Carbon Tetrachloride | 154.00 | 1.5867 | 6.0 | 28.0 | 60.0 |
| 3. | Chloroform | 119.40 | 1.4832 | 4.6 | 28.0 | 100.0 |
| 4. | Butane | 58.10 | 0.6012 | 4.3 | −0.5 | 380.0 |
| 5. | Methylene Chloride | 84.93 | 1.3266 | 4.0 | 28.0 | 221.0 |
| 6. | Carbon Disulfide | 76.00 | 1.2610 | 3.7 | 28.0 | 200.0 |

*These values represent minimum dimensions of Van der Waals diameters; here $O_2$ would be 2.8Å and $N_2$ would be 3.0Å. Ref.: M. B. Rao and R. G. Jenkins, Carbon 25, 445–446 (1987).

Figure 3:
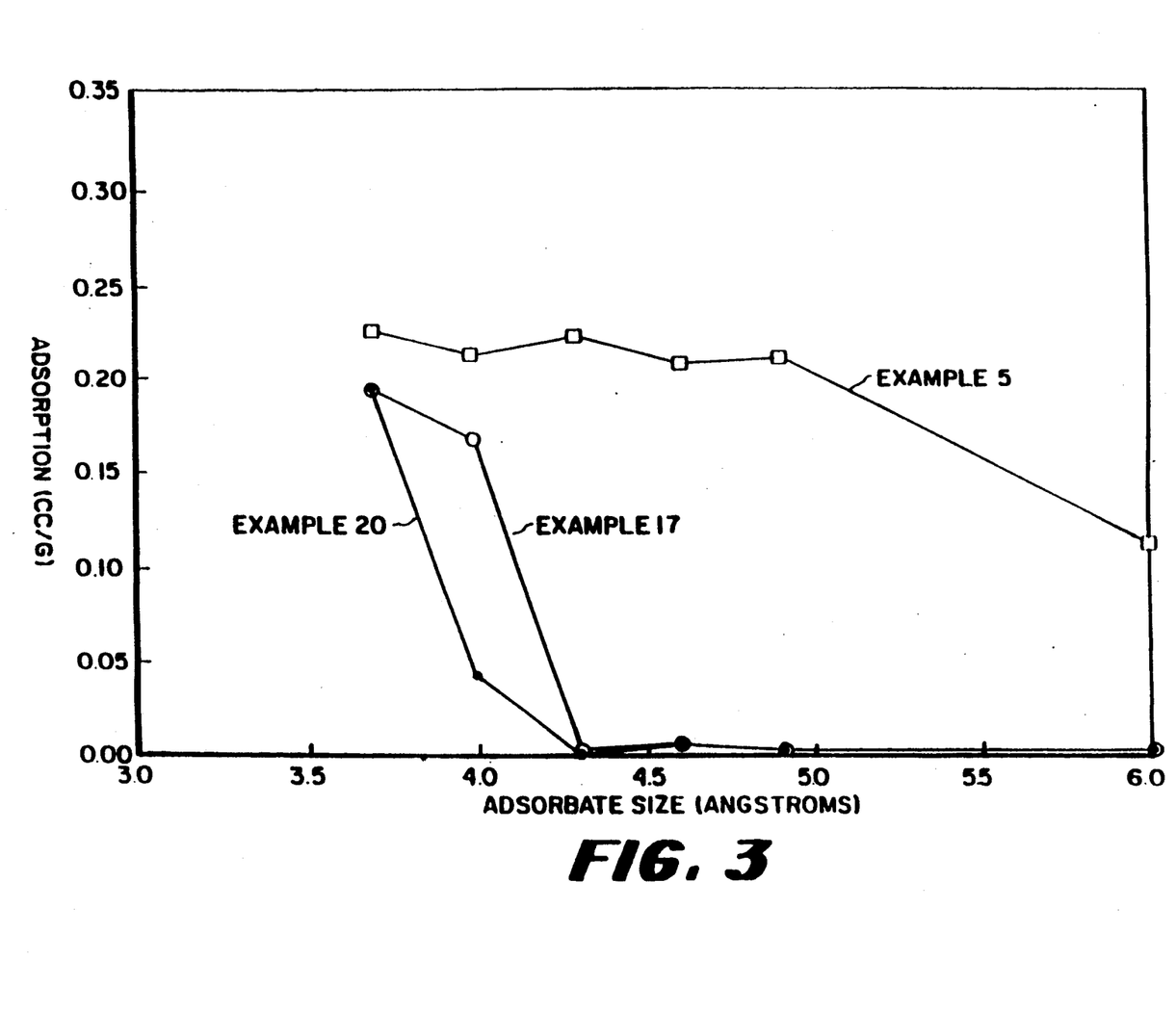
Figure 4:
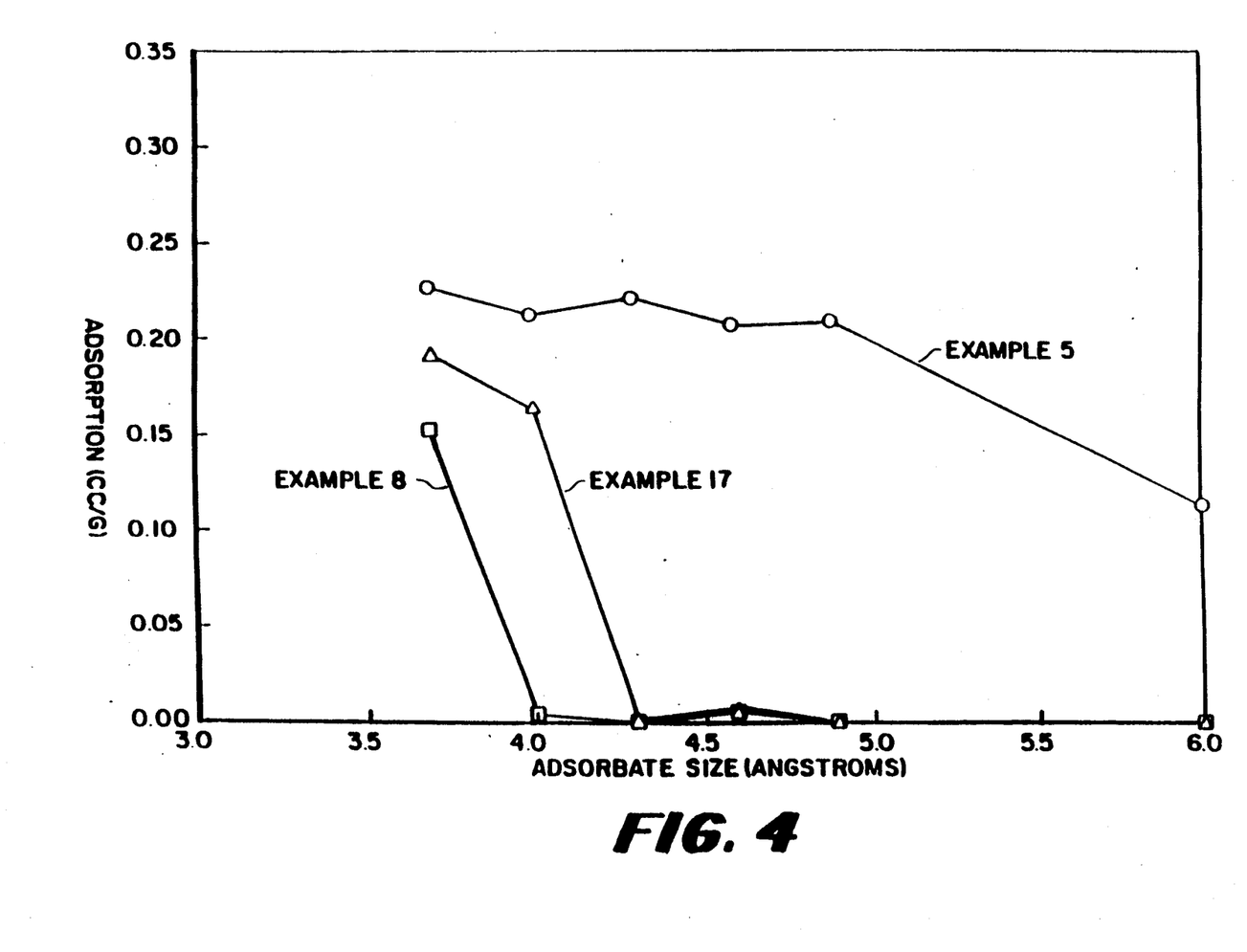

FIG. 2 shows plug gauge results for the samples of Examples 2 and 4. FIG. 3 shows results from Examples 5, 17, and 20, and FIG. 4 shows results for runs 5, 8, and 17. In combination with the adsorptive testing this molecular plug gauge method corroborates the description given for coking at the molecular level. The large hydrocarbon clearly narrows pore openings of 4–6 Å to 4 Å. Subsequent treatment with the small hydrocarbon then narrows these pore openings to less than 4 angstroms without decreasing adsorptive capacity or slowing adsorption rates to unacceptable levels. However, while treatment with only the small hydrocarbon narrows the pores to less than 4 angstroms (FIG. 4), adsorptive data (Example B) reveal that adsorption is slow and capacity is lost. In this case, it appears that a significant length of the pore is narrowed, whereas the two step coking allows more carbon to be deposited at the pore mouth as opposed to the pore interior.

TECHNIQUES

The following techniques are used to generate the data for this invention. In the molecular plug gauge method, each sample is charged to light weight cylinders which are suspended from quartz spring balances. Each sample and its balance are enclosed in individual glass tubes, and initial spring extension readings are taken for each sample. Approximately 5 ml of organic liquid is placed in a vapor tube in a hood. Once the transfer of the organic liquid is completed, the valve on the vapor tube is closed and the uncharged excess organic liquid is allowed to evaporate while in the hood. The vapor tube is then placed on the adsorption balance. The samples are evacuated and heated under vacuum to 100° C., to remove preadsorbed gases and moisture. When the system pressure is at $10^{-4}$ torr (still under vacuum by the turbo pump), the organic liquid is purified by undergoing several freeze/thaw cycles to remove noncondensible vapors (e.g., air). These cycles are repeated until no change in pressure is detected. The sample tubes are immersed in a controlled water bath at a specified temperature. Once the bath has reached this temperature, the vapor tube valve connecting to the adsorbate is opened and the system is brought to the specified pressure. Exactly 24 hours later, final spring extension readings are taken, and the pressure in the system is noted. The spring extensions are measured as a function of exposure.

The vapor pressures of the organic liquids were determined at 28° C. The determined vapor pressures were cut in half in order to prevent condensation in the balance due to the vapors reaching their saturation pressures (Po).

The Circulating Adsorption Unit (CAU) had a Servomex oxygen monitor, 570A with 311 cell and bypass plumbing to allow 0.5–8 liters per minute flow. This was connected to a Cole Parmer pump, (N-7088-48) with a diaphram head. The pump was modified with a variable speed controller and high torque motor, (G. K. Heller, GT-21) which allowed the circulation rate to be varied at varying pressures (0.2–1.0 atm.) while maintaining consistent pump speed at any given rate and pressure. The pump led to a glass cell adsorption unit equipped with a thermocouple. The glass cell, in turn, was connected to the oxygen monitor and an MKS barometer. pressure transducer 127AA001000A, power supply PDR-C-1C.

The response time of the $O_2$ monitor was 7 seconds to 90% of scale, and the pump was sized to allow circulation rates of 150–7000 $cm^3$/min. A compression wave does result from the operation of the single diaphragm pump, therefore it is important to record data at a rate which is fast relative to the pump rate. This was accomplished using a MACSYM computer, Model 120, which was programmed to collect data with adjustable frequency throughout the adsorption run.

The CAU pressure transient is the summation of pressure uptake transients for the individual gas components. Using equations for gravi-metric uptake equations were derived which describe the pressure and % $O_2$ traces measured on the CAU. System pressure as a function of time is given by the expression:

$$P = P_i - P_{O2}(1 - e^{-lt}) - P_{N2}(1 - e^{-mt}) \quad \text{(Equation 1)}$$

where
$P_i$ = initial system pressure
$P_{O2}$ = oxygen pressure sorbed at equilibrium
$P_{N2}$ = nitrogen pressure sorbed at equilibrium
l,m are mass transfer coefficients for $O_2$ and $N_2$ respectively The % $O_2$ measured versus time for air (21% $O_2$) is given by the expression:

$$\%O_2 = 100[0.21 P_i - P_{O2}(1 - e^{-lt})]/[P_i - P_{O2}(1 - e^{-lt}) - P_{N2}(1 - e^{-mt})] \quad \text{(Equation 2)}$$

Note that $P_{O2}$, $P_{N2}$, and $P_i$ are measured at t=0 and t=infinity, and can be obtained from the CAU data. The mass transfer coefficients can therefore be obtained by fitting equation 1 to the pressure data or by fitting equation 2 to the % $O_2$ data. The kinetic selectivity is the ratio of the mass transfer coefficients, l/m.

The amount of $O_2$ sorbed at short times (1 min) exceeds the equilibrium amount of $O_2$ sorbed, and gradually decays back to the equilibrium value as $N_2$ slowly diffuses into the micropores and displaces oxygen. This behavior is not accounted for by e.g. 1 and 2, and they therefore predict a working selectivity that is higher than the actual value. The observed "overshoot" of $O_2$ adsorption above the equilibrium value, which occurs in the kinetic region of the experiment is a competitive adsorption effect. At short times, when $O_2$ has largely saturated the adsorbent but $N_2$ has yet to permeate the adsorbent and approach its adsorptive capacity, $O_2$ will cover adsorption sites over the entire range of energetics. As $N_2$ permeates the adsorbent, it displaces much of the $O_2$ that was sorbed on the stronger adsorption sites. This occurs owing to the higher heat of adsorption of $N_2$ over $O_2$ on CMS carbons at low pressure ($\leq 1$ atm), and results in the lowest energy state of the adsorbate/adsorbent system at equilibrium. The net effect is that the apparent equilibrium constant for $O_2$ adsorption is higher in a noncompetitive experiment than when $O_2$ competes with $N_2$ for sites (which occurs as equilibrium is approached).

An additional term can be added to e.g. 1 and 2 to account for this behavior. Now:

$$P = P_i - (P_{O2} + P_{ex}e^{-mt})(1-e^{-lt}) - P_{N2}(1-e^{-mt}) \quad \text{(Equation 3)}$$

$$\% O_2 = 100[0.21P_i - (P_{O2} + P_{ex}e^{-mt})(1-e^{-lt})] / [P_i - (P_{O2} + P_{ex}e^{-mt})(1-e^{-lt}) - P_{N2}(1-e^{-mt})] \quad \text{(Equation 4)}$$

where $P_{ex}$ is the pressure of $O_2$ sorbed at short time which exceeds the equilibrium pressure of oxygen sorbed. When this additional term is added an excellent fit is obtained, and the selectivity value is in excellent agreement with values determined gravimetrically and volumetrically.

Contrary to the statement in U.S. Pat. No. 3,801,513 that air separation occurs in pores of less than 3.0 angstroms, we have found that the pores need to be wide enough to allow reasonable transport rates for $O_2$ and $N_2$ in the pore channels for the adsorbent to be effective in a PSA process. Pores of about 4 angstroms with pore mouth diameters of about 3.8 angstroms are effective for kinetic separation of air in the CMS adsorbents prepared via multi-step pyrolysis.

With such fine pore size control, these materials produced by this two step procedure would also be appropriate for separating other gas mixtures such as $O_2$/argon (since argon is slightly larger than $N_2$, the same material would be useful for separating $O_2$/argon as well as $O_2/N_2$.) By altering the two step deposition procedure to produce slightly different, but precisely controlled pore sizes and pore distributions, one should also be able to separate other mixtures such as $CO_2/N_2$, $H_2/CH_4$, or $N_2/H_2$ using pores sized to slightly different sizes.

Through proper choice of size and functionality, cracking volatile carbon-containing organic compounds using a two step process employing a large molecule compound followed by a smaller molecule compound allows one to turn inexpensive non-selective carbons into high value oxygen selective adsorbents.

Other advantages and embodiments of our invention will be apparent to those skilled in the art from the foregoing disclosure without departing from the spirit or scope of the invention.

We claim:

1. A process for making a modified carbon molecular sieve adsorbent, suitable for the separation of gases having differing molecular dimensions which affect their adsorption rates, by treating a starting carbon molecular sieve support wherein a portion of its micropores have a size in the range of about 4.5 to 8 Å which comprises:
   (a) contacting said starting support under pyrolysis conditions with a first volatile carbon-containing organic compound having a molecular dimension which precludes penetration of said micropores of about 4.5 to 8 Å for a time sufficient to form a carbonaceous surface layer on said support, thereby forming an intermediate carbon molecular sieve having narrowed pore openings, and
   (b) contacting said intermediate carbon molecular sieve under pyrolysis conditions in the absence of said first organic compound and in the presence of a second volatile carbon-containing organic compound having a molecular dimension smaller than that of said first organic compound but large enough to preclude penetration of most of the micropores remaining in said intermediate carbon molecular sieve.

2. The process of claim 1 wherein said modified carbon molecular sieve is suitable for separating oxygen and nitrogen.

3. The process of claim 1 wherein said starting support is characterized by micropores of about 4.5 to 6A.

4. The process of claim 1 wherein said pyrolysis conditions include temperatures of 500° to 900° C.

5. The process of claim 3 wherein said first and second carbon-containing compounds are first and second hydrocarbons and the pyrolysis conditions are in the range of 550° to 900° C.

6. The process of claim 5 wherein said first hydrocarbon is selected from 1,3,5-trimethylcyclohexane, 1,1-dimethylcyclohexane, cineole, and hydrocarbons having similar or larger minimum effective dimensions and said second hydrocarbon is selected from isobutylene and hydrocarbons having similar minimum effective dimensions.

* * * * *

UNITED STATES PATENT AND TRADEMARK OFFICE
CERTIFICATE OF CORRECTION

PATENT NO. : 5,098,880

DATED : March 24, 1992

INVENTOR(S) : Thomas R. Gaffney, et al

It is certified that error appears in the above-identified patent and that said Letters Patent is hereby corrected as shown below:

Column 14, Line 42

Delete "6A" and substitute therefore -- 6Å --

Signed and Sealed this

Second Day of November, 1993

*Attest:*

BRUCE LEHMAN

*Attesting Officer*    *Commissioner of Patents and Trademarks*